Nov. 10, 1931.  A. G. HARMS  1,831,108
BURIAL CASKET
Filed Jan. 25, 1929  3 Sheets-Sheet 1
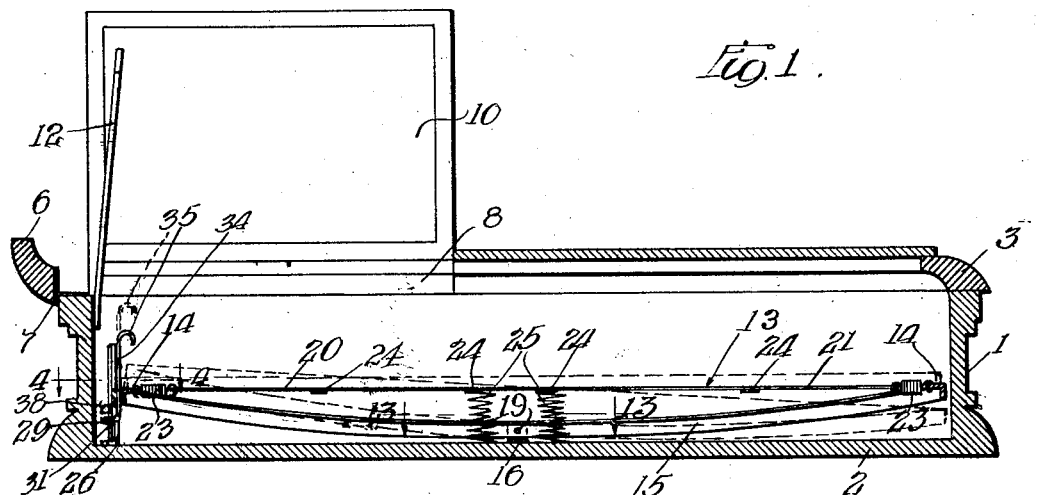
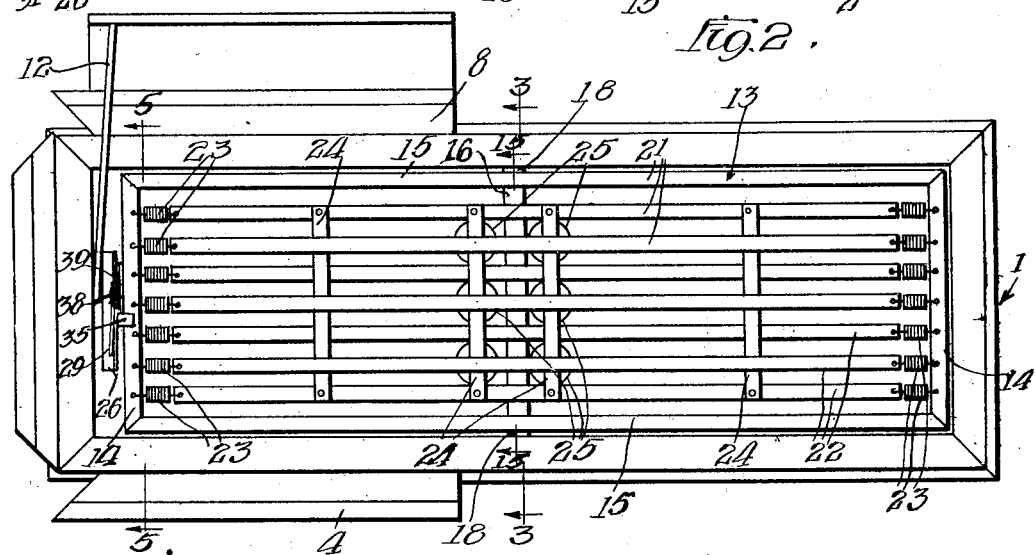
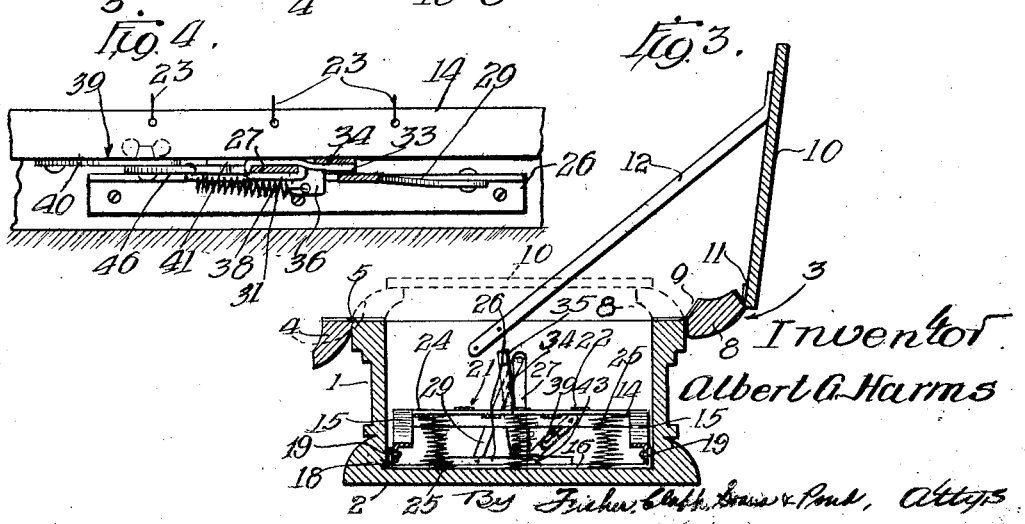
Inventor
Albert G. Harms Nov. 10, 1931.  A. G. HARMS  1,831,108
BURIAL CASKET
Filed Jan. 25, 1929    3 Sheets-Sheet 2
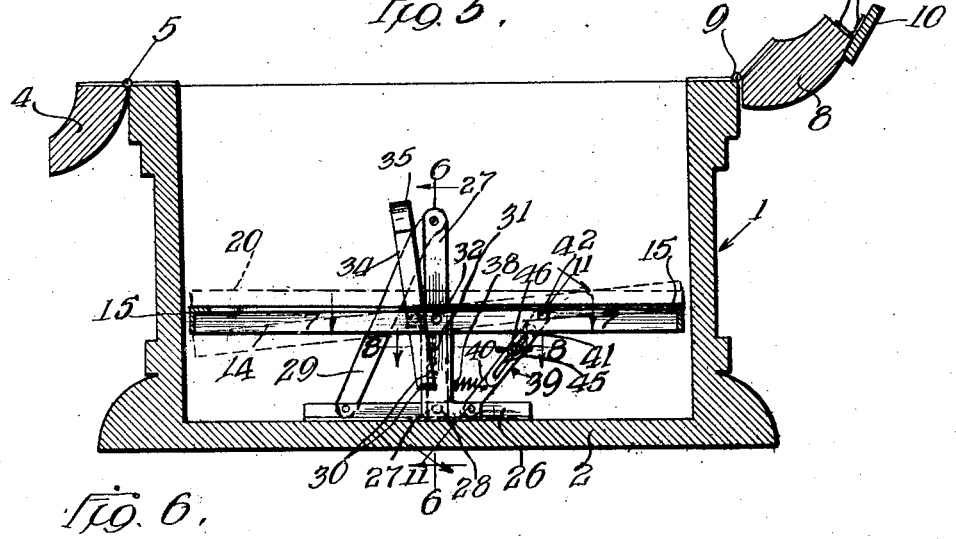
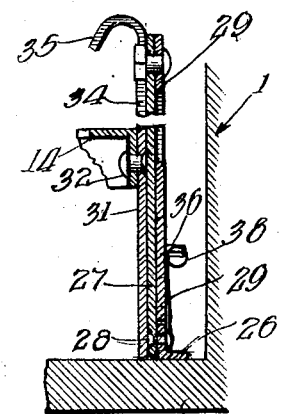
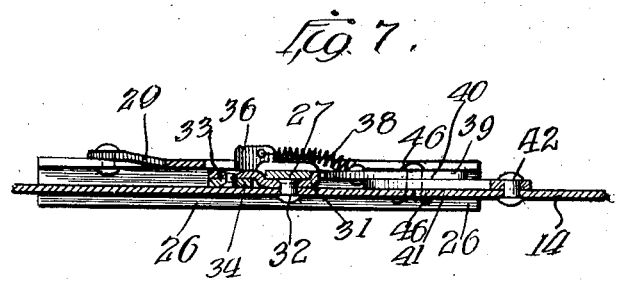
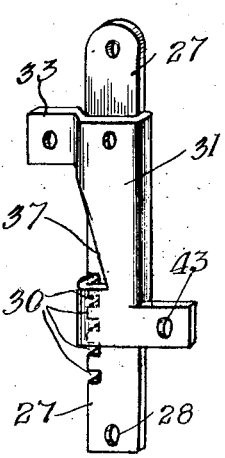
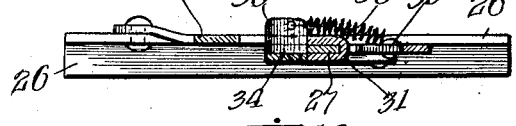
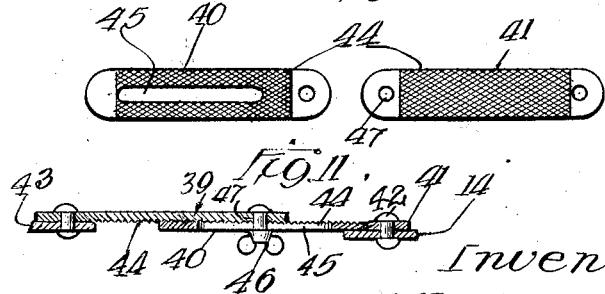
Inventor:
Albert G. Harms
By Fisher, Clapp, Soans & Pond, Attys.

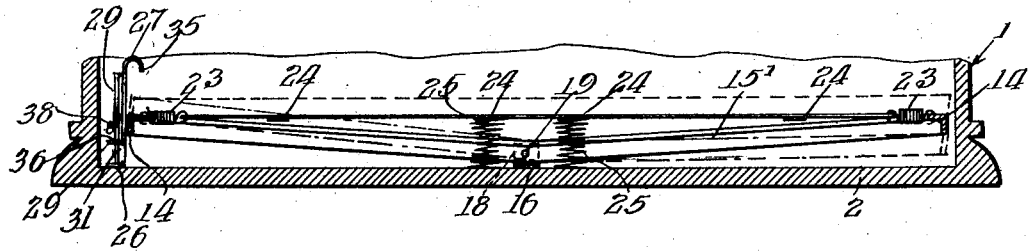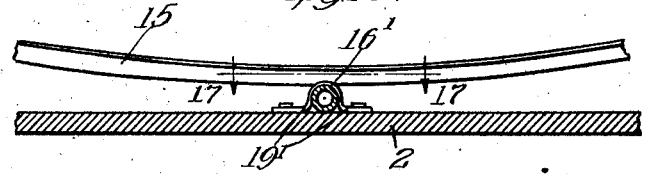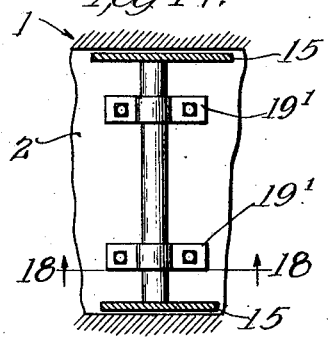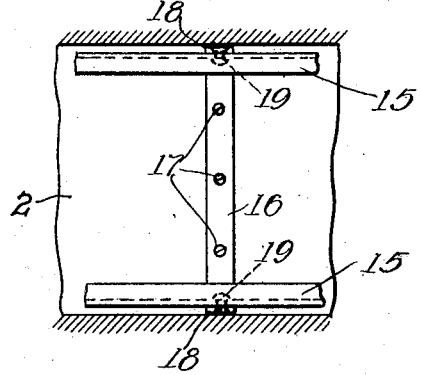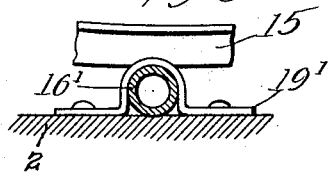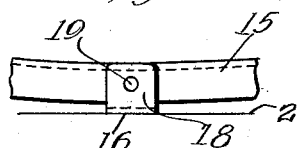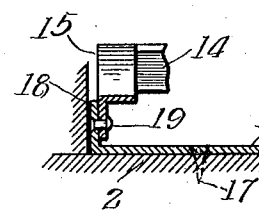

Patented Nov. 10, 1931

1,831,108

UNITED STATES PATENT OFFICE

ALBERT G. HARMS, OF CHICAGO, ILLINOIS

BURIAL CASKET

Application filed January 25, 1929. Serial No. 334,973.

My invention relates to burial caskets and more particularly to improvements over the constructions shown in my prior applications, Serial No. 184,463, filed April 18, 1927, and Serial No. 215,101, filed August 24, 1927, particularly the latter, and especially in simplifying and cheapening the cost of construction of the adjustable spring bottom therefor.

Among the objects of the invention are to provide a novel construction of spring frame which is curved or arched downwardly and in which the sides of the frame slope from an intermediate point upwardly toward the ends to give rigidity and strength, as well as to facilitate lowering of one arm of the deceased when on view, so as to be reposed in a natural or comfortable position, instead of necessitating tilting or canting of the frame or false bottom laterally or to one side; to facilitate longitudinal tilting or inclining of the false bottom or frame and allowing for a preponderance of weight at the upper portion of the body, as well as in simplifying the adjustment means of the frame for raising and lowering the same to place the frame at an inclination or to dispose it in a horizontal or a level position.

The device is so constructed so as to be hidden by the lining of the casket so as not to detract from the appearance thereof and yet is readily accessible for adjustment without destroying the lining.

With the above and other objects in view, the invention consists in certain novel structure and arrangement of parts to be hereinafter more particularly specified and pointed out in the claims.

In the accompanying drawings:—

Fig. 1 is a longitudinal sectional view of a casket having an adjustable spring bottom or false bottom and means for adjusting the same in accordance with the invention.

Fig. 2 is a top plan view of the construction shown in Figure 1.

Fig. 3 is a transverse sectional view taken on the line 3—3 of Figure 2.

Fig. 4 is an enlarged fragmentary horizontal sectional view taken on the line 4—4 of Figure 1.

Fig. 5 is an enlarged transverse sectional view taken on the line 5—5 of Figure 2.

Fig. 6 is an enlarged vertical sectional view taken on the line 6—6 of Figure 5.

Fig. 7 is an enlarged horizontal sectional view taken on the line 7—7 of Figure 5.

Fig. 8 is a similar view taken on the line 8—8 of Figure 5.

Fig. 9 is a perspective view of the adjustment slide.

Fig. 10 is a disassembled view of the adjustable brace for the frame.

Fig. 11 is an enlarged sectional view taken on the line 11—11 of Figure 5.

Fig. 12 is a fragmentary longitudinal sectional view showing a slightly modified form of frame construction.

Fig. 13 is a fragmentary plan view showing the manner of fulcruming the frame in Figures 1 and 12.

Fig. 14 is a side elevation of the structure shown in Figure 13.

Fig. 15 is an enlarged transverse sectional view taken on the line 15—15 of Figure 12.

Fig. 16 is a fragmentary sectional view showing another method of fulcruming the frame.

Fig. 17 is a fragmentary sectional plan view of the structure shown in Figure 16, taken on the line 17—17 thereof, and Fig. 18 is an enlarged sectional view taken on the line 18—18 of Figure 17.

Referring to the drawings in detail, the casket 1 may be of any well known construction or shape in plan and has a bottom 2, a sectional top molding 3, the front portion 4 of which may be hinged as at 5 to drop down over the side. The casket may be fitted with the usual shirred or other lining, not shown. The end section 6 of the molding is hinged at 7 to swing outwardly as shown in Figures 1 and 2, while the back portion 8 constituting a section of the molding 3 is hinged as at 9 to swing backwardly to an inclined position and may have the usual top panel 10 forming part of the closure hinged to the molding 8, as shown at 11, or rigidly attached thereto in a manner common in the art. The top panel may be formed in one or two sections or the casket may be of the type having a drop side which is also well known in the art. The panel 10 is adapted to be held in an upright position by and suitable means such as a tape or cord 12 when the panel is open for viewing the body in the casket at the open top thereof.

Mounted within the casket on the bottom 2 is an adjustable bed spring frame or false bottom 13, the frame 14 of which is preferably produced of angle iron with a horizontal inwardly extending flange and a vertical depending flange at the outside. The sides 15 are preferably arched, the intermediate portion being lowest and thence sloping upwardly to the ends of the frame.

In the embodiment shown in Figure 1, these side portions are curved or arcuate, and are connected at an intermediate point by a transverse brace 16 which may be secured to the bottom 2 as indicated at 17 and is in the form of a strip having upturned ends 18 secured to the sides 15 or in which the same may be pivoted as indicated at 19. This forms a fulcrum on which the frame 13 may rock for adjustment at different inclinations longitudinally to dispose the frame in a level or horizontal position or to raise the head end, especially when the body is on view. Preferably, the fulcrum is placed slightly nearer the head end than the foot end in view of the preponderance of weight at the head end or from the waist up. This also facilitates adjustment by requiring less manual effort to fulcrum the frame.

As previously stated, the adjustable false bottom is in the form of a bed frame adapted to take a mattress 20 and has a spring bottom 21 of suitable construction but shown as including longitudinal strips 22 connected to the ends of the frame by means of springs 23 and preferably having transverse strips 24, two of which are located substantially intermediately of the length of the bottom and arranged over a series of springs 25 resting upon the bottom 2 and adapted to be compressed or to expand according to the position in which the adjustable bottom is fulcrumed.

If desired, the springs 23 and the transverse strip 24 connecting the outer longitudinal strips 22, may be omitted at the foot end and the springs at the head end will give sufficient resiliency. This structure, in conjunction with the structure of the frame and manner of fulcruming the same for adjustment, considerably simplifies the structure over that disclosed in my prior application, Serial No. 215,101, and reduces the cost of production. By having the sides 15 of the frame depressed or arched, one arm, at the viewing side, may be lowered or dropped down to avoid an apparently cramped position of the body, without requiring that the frame be canted to one side.

The false bottom or frame is adapted to be adjusted to the desired inclination longitudinally, as well as held in horizontal position transversely and braced in the later position or allowed to incline slightly toward the viewing side and held in this position. As a simple means for this purpose, a support or bracket structure is provided at one end, preferably the head end, and includes an angle iron base member 26 arranged transversely and secured through suitable openings, therein to the bottom 2. An upright 27 is secured at 28 to the base portion 26 and is made rigid by an inclined or diagonal brace 29 between the base member at one side and the upper end of the upright. One edge of the upright is provided with a series of notches 30. A slide in the form of a flat sleeve 31 is slidably mounted on the upright 27 and at its upper end is connected to the end member 14 of the frame or adjustable false bottom as indicated at 32. The upper end is also provided with a pivot ear 33 for a lever 34 having a handle 35 at its upper end and having its lower end bent angularly as indicated at 36 to engage any one of the notches 30 in the upright or notched bar 27 through an opening 37 in the slide 31. The lever is held in its engaged position as by means of a spring 38. By this means the lever may be disengaged from its supporting position and the spring bottom readily adjusted on its fulcrum to the desired inclination or to a horizontal position.

As convenient means for mounting the spring 38 one end may be fastened to a brace 39, the other end being fastened to the angular end 36 of the lever. This brace is preferably extensible or adjustable in length and made up of a pair of setcions 40 and 41, the former of which is secured or pivoted to the end member 14 as indicated at 42 and the latter of which is similarly attached to a pivot ear 43 extending from the opposite side of the slide 31. The co-acting faces of the sections 40 and 41 are preferably knurled as indicated at 44 and one section is slotted as indicated at 45 to take a clamping bolt 46 mounted in an opening 47 in one end of the other section so as to permit adjustment of the length of the brace to dispose the frame in a horizontal position or to incline it toward one side and hold it in this position. As shown, the upper section is slotted and the clamping bolt or screw is carried by the upper end of the lower section, having the opening 47 for this purpose.

It may be pointed out that the adjustment means just described is preferably mounted at the head end of the frame of the casket, sufficient space being allowed to accommodate the same. In a hexagonal structure, the tappered end portion is sufficient to accommodate this adjustment means, but in any event, only a very narrow space between the head end of the frame and the head end of the casket is necessary in order to accommodate the adjustment means.

In the form shown in Figures 12 to 15 inclusive, the structure is the same except that the side portions 15' of the frame are rectilinear instead of being curved or they are disposed in angular relation from the intermediate or fulcrum point so as to simply require that the bar be bent in angular form. In effect, the sides are arched substantially as previously described, so as to rock or fulcrum on the center with the ends extending upwardly in spaced relation to the bottom of the casket.

In the form shown in Figures 16 to 18 inclusive, another method of fulcruming the arched frame is illustrated in which a tube 16' may be brazed or otherwise secured to the side members 15 and arranged to turn in bearing straps 19', secured to the bottom 2, to permit adjustment in the same manner as previously described.

While I have shown and described my invention in a preferred form, I am aware that various modifications and changes may be made without departing from the principles of the invention, the scope of which may be determined by reference to the appended claims.

I claim as my invention:

1. In combination with a burial casket, a frame having arched portions, body supporting means disposed on said frame and connecting the extremities of said arched portions, said body supporting means having a portion narrower than said arched portions to permit the dropping of a portion of a body supported thereon, and means for adjusting said body supporting means to an inclined or horizontal position.

2. In combination with a burial casket, a bottom member having side portions in the form of rockers fulcrumed intermediately, body supporting means disposed on said frame and connecting the extremities of said arched portions, said body supporting means having a portion narrower than said arched portions to permit the dropping of a portion of a body supported thereon, and means for holding said bottom member in an adjusted position.

3. In combination with a burial casket, a bottom member having longitudinal portions in the form of rockers fulcrumed intermediately, means for holding the same in an adjusted position, and means for bracing said bottom in a horizontal or transversely inclined position.

4. In a burial casket having a stationary bottom and a movable bottom, said movable bottom comprising a frame having sides in the form of arches fulcrumed intermediately, a spring bottom for the frame having intermediate springs resting on the bottom of the casket, and means at one end of the frame within the casket and upon the bottom thereof to adjustably rock the frame.

5. In a burial casket having a stationary bottom and a movable bottom, said movable bottom comprising a frame having sides in the form of rockers fulcrumed intermediately, a transverse fulcrum for the frame anchored to the bottom of the casket, an adjustable slide supporting one end of the frame, and means for holding the slide in an adjusted position and adapted as a means for raising and lowering said end of the frame, and a lever for actuating said slide.

6. In a burial casket having a stationary bottom and a movable bottom, said movable bottom comprising a frame having sides in the form of rockers fulcrumed intermediately, a transverse fulcrum for the frame anchored to the bottom of the casket, an adjustable slide supporting one end of the frame, a catch for holding the slide in an adjusted position, and an adjustable brace between the slide and the frame.

7. In a device of the class described and in combination with a casket, a body supporting device having a rocker-like member fulcrumed in said casket and having body supporting means lying in substantially a plane and connecting the extremities of said rocker-like member, and a resilient member on either side of said fulcrum and connected to said body supporting member.

8. In a device of the class described and in combination with a casket, a body supporting device having a rocker-like member fulcrumed in said casket and having body supporting means lying in substantially a plane and connecting the extremities of said rocker-like member, and a resilient member on either side of said fulcrum and connected to said body supporting member, said body supporting member having a portion thereof terminating inwardly of said rocker-like member and of said casket whereby a portion of a body resting thereon may be dropped.

9. In combination with a burial casket, a false bottom pivoted within said casket on a transverse axis, a vertical member fixed to an inner wall of said casket, a second vertical member slidable on said first vertical member and attached to said false bottom, one of said members having rack teeth formed thereon, and a handle member pivoted to the other of said vertical members and engageable with said rack teeth for adjusting the elevation of said false bottom about said axis.

10. In combination with a burial casket, a false bottom pivoted therein on a transverse axis, means for adjusting said false bottom about said axis, and means for adjustably tilting said false bottom about its longitudinal axis comprising a pair of relatively slidable members, one of which members engages an end of said false bottom on one side of said longitudinal axis and the other of which engages an inner wall of said casket.

11. In combination with a burial casket, a false bottom pivoted within said casket on a transverse axis, a vertical member fixed to an inner wall of said casket, a second vertical member slidable on said first vertical member and attached to said false bottom, one of said members having rack teeth formed thereon, a handle member pivoted to the other of said slidable vertical members and engageable with said rack teeth, and means for tilting said bottom about its longitudinal axis comprising a pair of relatively slidable members, one of which engages said false bottom at one end thereof on one side of said longitudinal axis and the other of which is attached to said casket.

ALBERT G. HARMS.